(12) United States Patent
Brown

(10) Patent No.: US 8,038,384 B2
(45) Date of Patent: Oct. 18, 2011

(54) OMNI-DIRECTIONAL TURBINE AND METHOD

(76) Inventor: Gene Brown, Marlin, TX (US)

( * ) Notice: Subject to any disclaimer, the term of this patent is extended or adjusted under 35 U.S.C. 154(b) by 148 days.

(21) Appl. No.: 12/284,198

(22) Filed: Sep. 22, 2008

(65) Prior Publication Data

US 2010/0074751 A1 Mar. 25, 2010

(51) Int. Cl.
*F03D 3/06* (2006.01)

(52) U.S. Cl. ....... 415/4.2; 415/4.4; 415/907; 416/197 A; 416/242

(58) Field of Classification Search ............ 415/4.2, 415/4.4, 907; 290/44, 55; 416/242, 111, 416/197 A
See application file for complete search history.

(56) References Cited

U.S. PATENT DOCUMENTS

| | | | | |
|---|---|---|---|---|
| 259,563 A | * | 6/1882 | Lowther | 416/139 |
| 864,789 A | * | 9/1907 | Kickbush | 415/4.2 |
| 4,303,835 A | * | 12/1981 | Bair | 290/55 |
| 4,408,958 A | * | 10/1983 | Schacle | 416/237 |
| 4,609,827 A | * | 9/1986 | Nepple | 290/44 |
| 5,951,249 A | * | 9/1999 | Aylor | 416/42 |
| 2003/0185666 A1 | * | 10/2003 | Ursua | 415/4.2 |
| 2004/0156723 A1 | * | 8/2004 | Tsipov | 416/197 A |
| 2008/0145224 A1 | * | 6/2008 | Mitchell et al. | 416/132 B |

* cited by examiner

*Primary Examiner* — Edward Look
*Assistant Examiner* — Jesse Prager
(74) *Attorney, Agent, or Firm* — Thrasher Associates

(57) ABSTRACT

The invention teaches a turbine capable of receiving wind power and transferring wind power into mechanical energy, and capable of coupling with a generator. The turbine includes a generally flat horizontally mountable support plate capable of rotation about a central axis, the support plate having a plurality of pivot modifications located proximate to an outside circumference, and vanes coupled to the support plate at the pivot modification, each vane having a vane shaft coupled between a pivot modification on the first support plate and a pivot modification on a cap plate, each vane supported by a first rib and a second rib having an exterior edge defined as the exterior circumference edge of the head and the interior circumference edge of the tail, and a material attached between the exterior of the first rib and the exterior of the second rib.

16 Claims, 3 Drawing Sheets

US 8,038,384 B2

OMNI-DIRECTIONAL TURBINE AND METHOD

TECHNICAL FIELD OF THE INVENTION

The invention relates generally to systems, methods and devices for converting fluid energy to mechanical energy, and more specifically to turbines.

PROBLEM STATEMENT

Interpretation Considerations

This section describes the technical field in more detail, and discusses problems encountered in the technical field. This section does not describe prior art as defined for purposes of anticipation or obviousness under 35 U.S.C. section 102 or 35 U.S.C. section 103. Thus, nothing stated in the Problem Statement is to be construed as prior art.

Discussion

For simplicity of explanation, the below discussion is directed toward windmills; however, it is readily understood to those of skill in the art that the shortcomings of the art described (and, later, the teachings of the invention), are applicable to any fluid system.

Windmills and watermills have long been used to capture the energy of flowing fluids. Typically, windmills and watermills use devices for catching of force of a passing fluid to a central axel. Typically, in windmills the force of the passing wind is captured through sails or an aerodynamic propeller, and the force is passed to the central axel via spokes. More recently, advances in windmill technology have resulted in vertical windmills being shown to be efficient "low footprint" devices for capturing wind energy, and have also resulted in the application of windmills to the creation of electric energy. However, windmills still suffer from disadvantages. For example, traditional windmills need substantial wind to generate electricity, and the windmill needs to be directed to face the wind to maximize efficiency (and, in some cases, to work at all). Accordingly, to overcome these and other disadvantages associated with prior-art windmills, it would be advantageous to provide a windmill that captures wind effectively regardless of the wind's direction, and is equally effective regardless of wind direction. The invention teaches such systems, methods and devices.

BRIEF DESCRIPTION OF THE DRAWINGS

Various aspects of the invention, as well as an embodiment, are better understood by reference to the following detailed description. To better understand the invention, the detailed description should be read in conjunction with the drawings, in which like numerals represent like elements unless otherwise stated.

EXEMPLARY EMBODIMENT OF A BEST MODE

Interpretation Considerations

Figure 1:
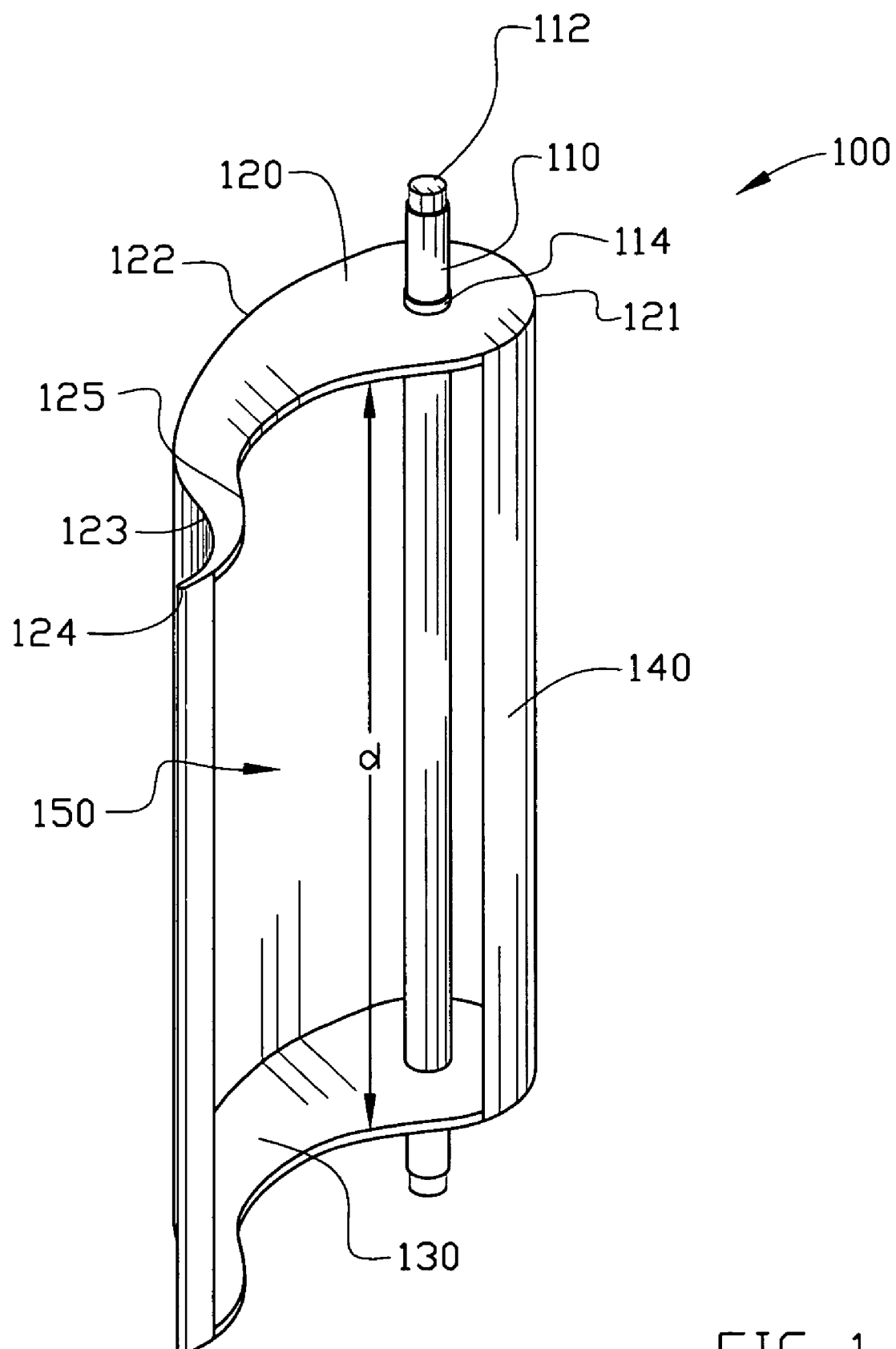
FIG. 1 shows one embodiment of the vane employed in the turbine.

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching").

Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for-functioning-" or "step for-functioning-" in the Claims section. Sixth, the invention is also described in view of the Festo decisions, and, in that regard, the claims and the invention incorporate equivalents known, unknown, foreseeable, and unforeseeable. Seventh, the language and each word used in the invention should be given the ordinary interpretation of the language and the word, unless indicated otherwise. Of course, the foregoing discussions and definitions are provided for clarification purposes and are not limiting. Words and phrases are to be given their ordinary plain meaning unless indicated otherwise.

Description of the Drawings

The invention is a turbine that can be used to capture a fluid's flow, and covert that flow into mechanical energy regardless of the direction of that flow. Accordingly, the turbine is said to be "omni-directional." Although the invention is applicable to any fluid system, including traditional fluids such as water, its use is not limited by the fluid system; accordingly, the invention has application in steam and air systems as well. Because it is believed most persons are familiar with turbines used to transfer air to mechanical energy (known as windmills), for simplicity of explanation, the below discussion is directed toward windmills. Thus, it is readily understood to those of skill in the art that the teachings of the invention, are applicable to any fluid system.

FIG. 1 shows one embodiment of a vane 100 to be employed by an inventive turbine. The vane comprises a vane shaft 110 which extends through a first rib 120 and a second rib 130. Each rib 120, 130 is generally flat, and has a generally s-shaped airfoil-like profile. Those familiar with mechanical drawing instruments may say that the profile is more akin to that of a "french curve", but, in any event, the drawings convey the unique nature of the profile of the vane 100. Like each other rib, the rib 120 has a head 121 and tail 124, such that the width of the head 124 tapers to a narrow tail 124; and, it can be further said that the shaft 110 extends through each rib 120, 130 at the head 124. In practice, the shaft 110 may be shaped with differing diameters to accommodate each rib 120, 130, and the ribs may be secured in place via a lock-ring 114. It will be appreciated that in the present preferred embodiment, the ribs 120, 130 are preferably secured to the shaft 110 so that they do not rotate about it.

The tail is structured so that it curls away from an adjacent vane when the opposite side of the tail is at rest upon it, and all the tails of each vane having a tail curl in the same direction (though they may have differing degrees of curl, and the degree of curl may vary along the distance of any particular vane). The curve (or degree of the curl) and length of the tail affects how quickly a vane is separated from an adjacent vane by the wind or other fluid. Typically, a longer tail with less curl of perhaps about 10-degrees at the point the tail separates from an adjacent vane (the tangent) creates more lift than a short tail or a tail with too much curl, such as a nearly 90-degree angle. However, 15-degree, 20-degree, 30-degree and 45-degree curls/tangents also produce strong lift characteristics. Furthermore, although the tail is illustrated as having material "skin" along its exterior edge/interior circumference, alternative embodiments contemplate having material skin covering at least some portion of the interior edge/exterior circumference of the tail.

The first rib 120 and the second rib 130 have an exterior edge defined as the exterior circumference edge 122 of the head 121 and the interior circumference edge 123 of the tail 124. When aligned properly, the first rib 120 and second rib 130 are aligned such that their similar shapes overlap so as to present a single profile when viewed from the axis of the shaft. Furthermore, when mounted to the shaft 110, the first rib 120 and the second rib 130 are separated by a distance "d."

A weather-resistant material 140 is attached between the exterior of the first rib 120 and the exterior of the second rib 130, so as to present a substantially uniform surface there between. The material may be a metal, a plastic, a carbon composite material, a resin-saturated fabric, or other material suited for the particular environment of the turbine. Other exemplary material are listed in the table, below. The space between the ribs 120, 130 and the material 140 defines an open-interior of the vane 100.

Figure 2:
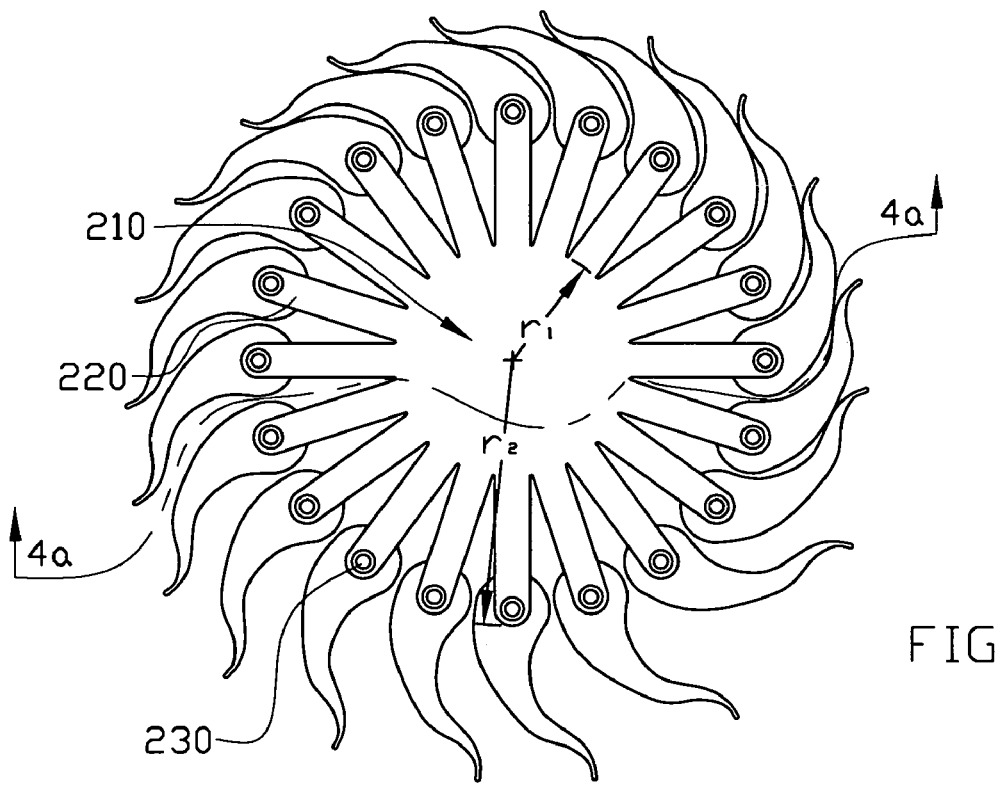
FIG. 2 illustrates a top-down view of the turbine.
Figure 3:
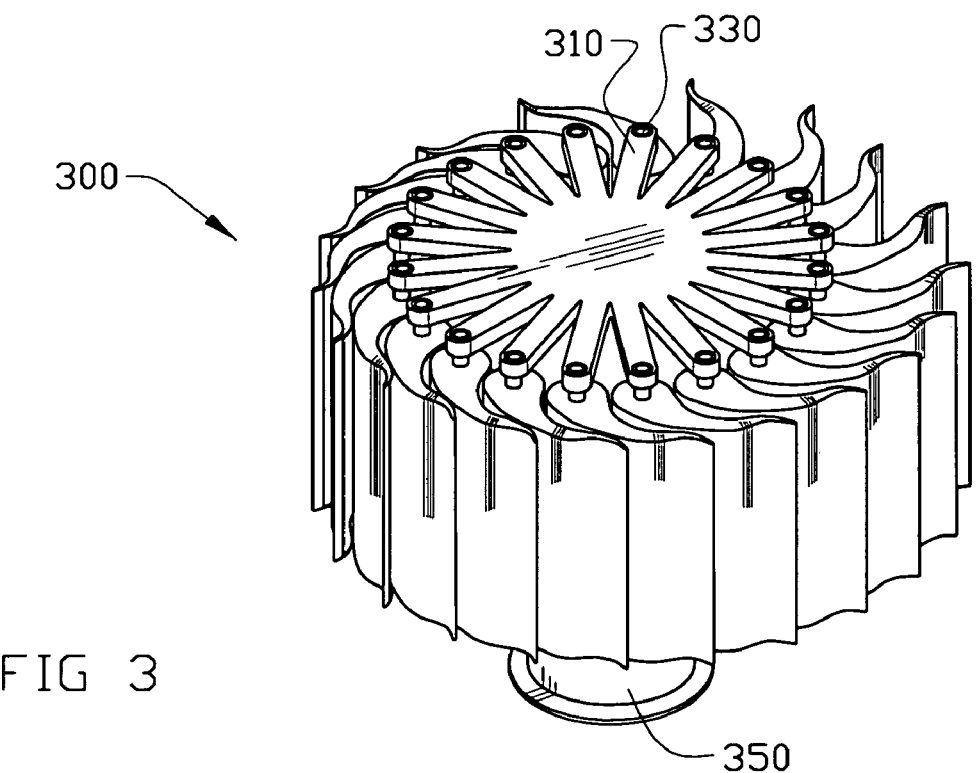
FIG. 3 is shows one embodiment of the turbine coupled to a generator.

FIG. 2 illustrates a top-down view of the turbine, while FIG. 3 is shows one embodiment of the turbine coupled to a generator 350. The following discussion makes simultaneous reference to FIGS. 2 and 3, in which is seen a plurality of vanes coupled to a support plate 210 at pivot modifications 230. Although 20 vanes are illustrated in the figures, it is understood that the actual number of vanes can vary from a just a few to 50, 60, or more vanes (the number of vanes being a function of the radius of the turbine's plates, as well as the length, width, and height of each vane). Additionally, each vane need not be identical to the others. Although a support plate may be circular, the support plate 210 comprises a hub defines by an interior radius "r1", having spokes that extend to an exterior radius "r2." Each arm is of sufficient width to support the forces encountered by mounting a vane thereto. Each spoke has a pivot modification 230 located proximate to the exterior radius r2, and may be implemented as a divot for accepting the shaft 110, or as a hole for accepting the shaft 110 (holes are shown in the figures). If a divot is utilized, clearly it is provided on the side of the mounting plate facing the vanes. Of course, other pivot modifications enable the functionality of the invention, and those known, unknown, foreseeable and unforeseeable are incorporated into the scope of the invention. A cap plate 310, substantially similarly shaped as the support plate 210, also includes pivot modifications 330, so that a vane can be rotatably coupled between a pivot modification 130 on the support plate 230 and a pivot modification 330 on a cap plate 310. From FIG. 3 it is more clearly seen that the tail of each vane is "upturned" with respect to the top of the adjacent vane upon which it rest so as to more effectively catch a flowing fluid and pivot the vane open with respect to the fluid flow.

Figure 4:
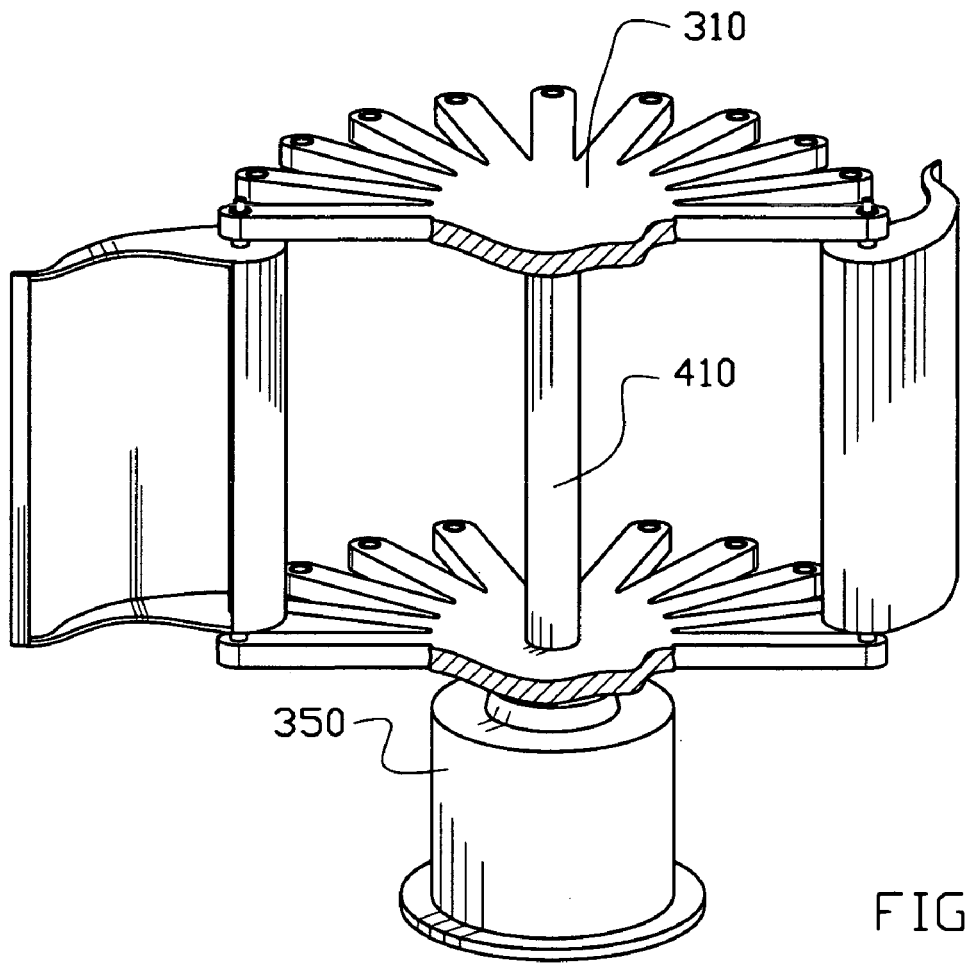
FIG. 4 is a side-view of the present invention taken along cut-line 4-4 of FIG. 2.

FIG. 4 is a side-view of the present invention taken along cut-line 4-4. From FIG. 4 one may see a vertical drive shaft 410 occupying the central axis, the vertical drive shaft 410 coupled to the cap plate at a central point, and coupled to and extending through the support plate 210 to couple to the generator 350. Accordingly, it is seen that the support plate/cap plate/turbine is rotatable about a central axis, which is the imaginary line approximately at the center of the vertical shaft 410.

Figure 5:
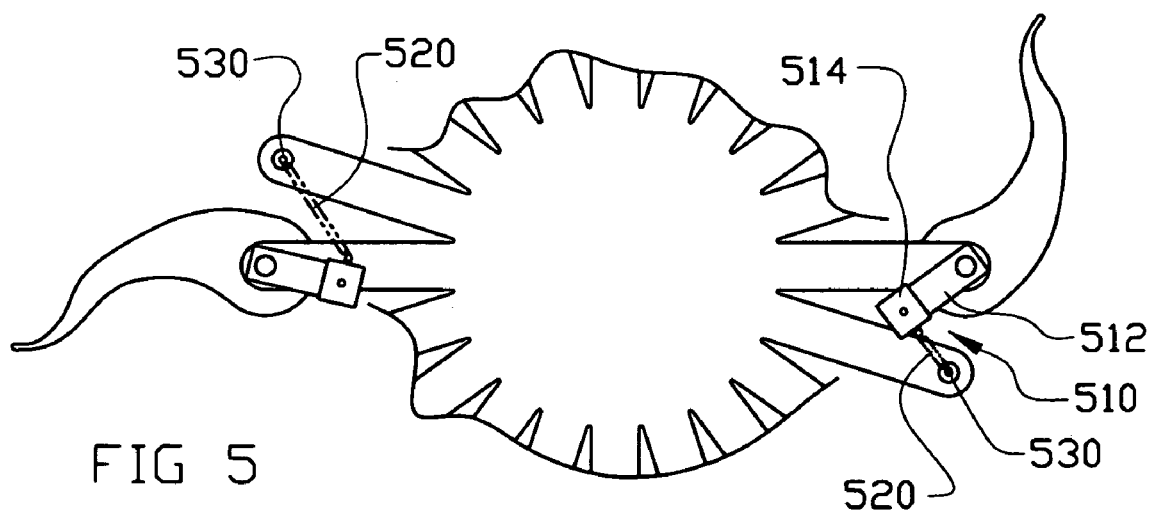
FIG. 5 is a top-down view of selected elements of an alternative embodiment of the invention, which incorporates counterweights and limiting pins.

FIG. 5 is a top-down view of selected elements of an alternative embodiment of the invention, which incorporates counterweights and limiting pins. The counterweight 510 includes an arm 512 which is coupled to a vane shaft at the pivot modification. In practice, the counterweight balances the weight of the vane it is attached to at approximately the vane shaft/pivot modification point. Additionally, a counterweight may be located above the cap plate, as well as below the support plate. In this alternative embodiment, the counterweights are smaller, and create more-even torque than does a single counterweight located either above the cap plate or below the support plate. The counterweight also includes a head 514. The counterweight head is preferably a dense material, and is also strong enough to support the attachment of a limiting pin 520 at a counterweight head attachment 522 which is itself attached to an adjacent pivot modification 530. In practicing the alternative embodiment of the invention, each vane has a counterweight and limiting pin combination attached thereto in a manner substantially similar to that discussed above. However, counterweights may also be provided to serve other functions. For example, a heavier counterweight results in a slower rotation, and an increase in the angular momentum of the windmill at a given speed.

TABLE

Non-Exhaustive, Exemplary Materials

| | | |
|---|---|---|
| Acrylic | Acetate | Hemp |
| Lyocell | Anidex | Cotton |
| Nylon | Aramid | Pashmina |
| Olefin | Aylon | Silk |
| Polyester | Elastoesler | Wool |
| Polypropylene | Glass | Metal |
| Rayon | Lyocell | |
| Spandex | Melamine | |

Thus described, the inventive device lends itself to practice as a methodology of generating mechanical energy from a fluid flow. Accordingly, the turbine may be driven as a windmill by using a plurality of vanes in a device as shown and described above, to capture mechanical energy from a flowing fluid. As a vane in a closed position (meaning that the interior tale—at its exterior radius—of the vane touches an adjacent vane) receives energy from a fluid flow, the tail will "lift" away from the adjacent vane until it is limited from opening further by the limiting pin(s) attaching it to a second adjacent vane (or the second adjacent vane itself, in the event that limiting pins are not used). Then, this energy may be translated by the turbine into rotational mechanical energy. Of note, in addition to just catching the flow energy of the fluid, the open interior of each vane insures that fluid is "captured" and its turbulence is used to propel each open vane beyond what would normally be the case if the vanes were designed not to capture the fluid flow. As discussed above, one advantage to this methodology is that rotational mechanical energy is generated regardless of the direction of the fluid flow, regardless of whether that fluid is air, steam or water. Thus, the limiting pins prevent any vane from opening so far as to mechanically jeopardize an adjoining vane.

Though the invention has been described with respect to a specific preferred embodiment, many variations and modifications (including equivalents) will become apparent to those skilled in the art upon reading the present application. It is therefore the intention that the appended claims and their equivalents be interpreted as broadly as possible in view of the prior art to include all such variations and modifications.

I claim:

1. A turbine capable of receiving wind power and transferring wind power into mechanical energy, and capable of coupling with a generator, the turbine comprising:
   a generally flat horizontally mountable support plate capable of rotation about a central axis, the support plate having a plurality of pivot modifications located proximate to an outside circumference,
   a first vane coupled to the support plate at the pivot modification, the vane comprising:
      a vane shaft coupled between a pivot modification on the first support plate and a pivot modification on a generally flat horizontally mountable cap plate,
      a first rib being generally flat, and having a generally s-shaped airfoil-like profile, the rib having an head and tail, such that the width of the head tapers to a narrow tail, the shaft extending through the first rib at the head,
      a second rib substantially similarly shaped as the first rib, the shaft extending through the second rib at a second rib head,
      the first rib and the second rib having an exterior edge defined as the exterior circumference edge of the head and the interior circumference edge of the tail,
      the first rib and second rib being aligned such that their similar shapes approximately identically overlap so as to present a single profile when viewed from the shaft, the first rib and the second rib being separated by a distance "d",
      a material attached between the exterior of the first rib and the exterior of the second rib, so as to present a substantially uniform surface there between;
   the cap plate shaped substantially similar to the support plate;
   a vertical drive shaft occupying the central axis, the vertical drive shaft coupled to the cap plate at a central point, and coupled to and extending through the support plate;
   a plurality of counterweights, each counterweight coupled to each pivot modification, each counterweight having a head, the head being the end of the counterweight opposite of the end of the counter weight coupled to the pivot modification; and
   a plurality of limiting pins, each limiting pin is coupled between a pivot modification and a counterweight head.

2. The device of claim 1 wherein the pivot modification is a hole.

3. The device of claim 1 wherein the support plate is circular.

4. The device of claim 1 wherein the support plate comprises a central circular hub, and a plurality of spokes extending from the central circular hub, each spoke having a pivot modification thereon.

5. The device of claim 1 wherein the counterweight weighs as much as the vane, the head of the counterweight being sufficiently massive such that the center of gravity of the vane-counterweight combination is located approximately at the vane shaft, at the pivot modification.

6. The device of claim 1 wherein the material is a metal.

7. The device of claim 1 wherein the material is a carbon composite.

8. The device of claim 1 wherein the material is a cloth and resin combination.

9. The device of claim 1 further comprising a second vane, a third vane, a fourth vane, a fifth vane, a sixth vane, a seventh vane, an eighth vane, a ninth vane, a tenth vane, an eleventh vane and a twelfth vane, each vane being coupled between a pivot modification of the support plate and a pivot modification of the cap plate.

10. A method of driving a windmill, comprising:
   using a plurality of vanes that are attached between a generally flat horizontally mountable support plate capable of rotation about a central axis, the support plate having a plurality of pivot modifications located proximate to an outside circumference,
   a first vane coupled to the support plate at the pivot modification, the vane comprising:
      a vane shaft coupled between a pivot modification on the first support plate and a pivot modification on a generally flat horizontally mountable cap plate,
      a first rib being generally flat, and having a generally s-shaped airfoil-like profile, the rib having an head and tail, such that the width of the head tapers to a narrow tail, the shaft extending through the first rib at the head,
      a second rib substantially similarly shaped as the first rib, the shaft extending through the second rib at a second rib head,
      the first rib and the second rib having an exterior edge defined as the exterior circumference edge of the head and the interior circumference edge of the tail, the first rib and second rib being aligned such that their similar shapes approximately identically overlap so as to present a single profile when viewed from the shaft, the first rib and the second rib being separated by a distance "d", a material attached between the exterior of the first rib and the exterior of the second rib, so as to present a substantially uniform surface there between;

the cap plate shaped substantially similar to the support plate;

a vertical drive shaft occupying the central axis, the vertical drive shaft coupled to the cap plate at a central point, and coupled to and extending through the support plate;

a plurality of counterweights, each counterweight coupled to each pivot modification, each counterweight having a head, the head being the end of the counterweight opposite of the end of the counter weight coupled to the pivot modification; and a plurality of limiting pins, each limiting pin is coupled between a pivot modification and a counterweight head;

the vanes adapted to capture energy regardless of the direction of fluid flow; and transferring energy from the fluid flow into rotational mechanical energy.

11. The method of claim 10 wherein the fluid is air.

12. The method of claim 10 wherein the fluid is water.

13. The method of claim 10 wherein the fluid is steam.

14. The method of claim 10 further comprising limiting an angular travel of each vane with a limiting pin.

15. The method of claim 10 wherein each tail is sufficiently tapered to catch a fluid flow to open the vane such that the vane catches the fluid flow.

16. The method of claim 15 wherein each vane captures fluid flow within the material and the ribs of the vane, which together define an open interior of the vane.

* * * * *